United States Patent
Feigner et al.

(10) Patent No.: US 6,246,404 B1
(45) Date of Patent: *Jun. 12, 2001

(54) AUTOMATICALLY GENERATING CODE FOR INTEGRATING CONTEXT-SENSITIVE HELP FUNCTIONS INTO A COMPUTER SOFTWARE APPLICATION

(75) Inventors: Randall James Feigner, Kirkland; Ralph Everett Walden, Redmond, both of WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/272,931

(22) Filed: Mar. 18, 1999

Related U.S. Application Data (62) Division of application No. 08/792,533, filed on Jan. 31, 1997, now Pat. No. 5,933,139.

(51) Int. Cl.$^7$ ............................................. G06F 3/14
(52) U.S. Cl. ....................................... 345/338; 717/2
(58) Field of Search ........................... 345/338, 336, 345/337, 326, 333, 334, 335, 339, 346, 347, 354, 967; 395/701, 702; 709/302; 707/102, 103, 104; 434/118; 717/1, 2

(56) References Cited

U.S. PATENT DOCUMENTS

| | | | |
|---|---|---|---|
| 4,970,678 | 11/1990 | Sladowski et al. ................. | 707/531 |
| 4,992,972 | 2/1991 | Brooks et al. ..................... | 345/338 |
| 5,029,113 | 7/1991 | Miyoshi et al. .................... | 345/336 |
| 5,287,448 | 2/1994 | Nicol et al. ........................ | 345/337 |
| 5,535,323 | 7/1996 | Miller et al. ....................... | 345/338 |
| 5,546,521 | 8/1996 | Martinez ............................ | 345/338 |
| 5,581,684 | 12/1996 | Dudzik et al. ..................... | 345/338 |
| 5,627,958 | 5/1997 | Potts et al. ........................ | 345/336 |
| 5,675,520 | 10/1997 | Pitt, III et al. ...................... | 703/23 |
| 5,715,415 | 2/1998 | Dazey et al. ....................... | 345/338 |
| 5,754,858 | * 5/1998 | Broman et al. .................... | 717/1 |
| 5,821,932 | * 10/1998 | Pittore ................................ | 345/347 |
| 5,877,757 | 3/1999 | Baldwin et al. ................... | 345/336 |
| 5,933,139 | * 8/1999 | Feigner et al. .................... | 345/338 |
| 5,933,140 | 8/1999 | Strahorn et al. ................... | 345/338 |
| 5,940,614 | 8/1999 | Allen et al. ........................ | 717/1 |
| 5,982,365 | * 11/1999 | Garcia et al. ...................... | 345/336 |

OTHER PUBLICATIONS

Herold et al., "Interactive Design Methodology—Designing a Client/Server Hypertext Help System," Dr. Dobb's Journal, Jun. 1995, p. 40 (9 pp).

Stevens, A., "C Programming—Help and the Installation Blues," Dr. Dobbs Journal, Sep. 1995, p. 129 (17 pp).

Henke, H., "Developing On–Line Help: A Practical Approach," Proc. of Int'l Prof. Comm. Conf., Nov. 1991, vol. 2, pp. 231–235.

King, T., "A Self–Referential Hypertext Engine—A Simple Engine for Context–Sensitive Help," Dr. Dobbs Journal, Jun. 1990, p. 34 (10 pp).

Speranza, P., "RoboHelp is Definitely Worth the Price," InfoWorld, vol. 16, No. 20, May 1994, p. 101.

* cited by examiner

Primary Examiner—Crescelle N. dela Torre
(74) Attorney, Agent, or Firm—Klarquist Sparkman Campbell Leigh & Whinston, LLP (57) ABSTRACT

A computer software application includes multiple software components such as graphical control objects. A help editor receives context-sensitive help information associated with the graphical control objects. Using this help information as well as information about the graphical control objects, the help editor creates a header file and a map data structure. A help developer edits the header file and map data structure to produce a configuration of context-sensitive help functions for the computer software application. The help editor generates a source code header file and a source code map data structure according to the user-indicated configuration for integrating context-sensitive help functions into the computer software application.

23 Claims, 8 Drawing Sheets

AUTOMATICALLY GENERATING CODE FOR INTEGRATING CONTEXT-SENSITIVE HELP FUNCTIONS INTO A COMPUTER SOFTWARE APPLICATION

RELATED APPLICATION DATA

This application is a division of U.S. patent application Ser. No. 08/792,533, filed Jan. 31, 1997, now U.S. Pat. No. 5,933,139, entitled "Method and Apparatus for Creating Help Functions."

FIELD OF INVENTION

The present invention relates generally to providing context sensitive help functions for a computer software application. Specifically, the present invention pertains to automatically generating code for integrating context-sensitive help functions into a computer software application.

BACKGROUND OF THE INVENTION

When computer software is created, it is desirable to create a set of help functions that are included with the computer software. The help functions explain various components of the computer software using text and graphics. They can be invoked by a user when the user has a question about the functionality of a particular computer software component or encounters a problem with the computer software during use.

Many computer operating systems such as Windows 95 and Windows NT by Microsoft Corporation of Redmond, Wash. and others use dialog boxes in windows created by the operating system to display help information. A dialog box is a pop-up box which displays additional information for a user and typically contains one or more graphical objects such as graphical buttons that can be selected. Several windowed operating systems such as Windows 95 and Windows NT also provide a context-sensitive help system. A context-sensitive help system allows a user to select with a mouse or other pointing device a graphical control in a dialog box, and then with another selection request help on the graphical control. A graphical control is typically a graphical button, pull-down menu, or other graphical entity that accepts input from a user (e.g., a "click" from a mouse). An example of a graphical control is an Object Linking and Embedding (OLE) control or an ActiveX control known to those skilled in the art. For more information on OLE controls see *OLE Controls Inside Out*, by Adam Denning, Microsoft Press, Redmond, Wash., 1995. In response to the selection of a graphical control, an operating system help system typically displays a pop-up box containing help information that describes the control's purpose.

During the software development process, help functions are written by help writers, and the remaining portions of the computer software are created by software developers. Help writers are typically responsible for creating the information source files which contain the help information, and assigning unique help function identifiers to help components being developed. The software developers use the help information and help function identifiers as they create a computer software application. In some instances, the help writers and the software developers may be the same individuals.

Incorporating help functions into computer software presents some difficult problems. The graphical controls used within the computer software may change many times during the software development process. Some controls may be added or changed while other controls are removed. The help writers and software developers have to coordinate these changes. The help writers have to update existing help information and help function identifiers based on the changes to the graphical controls. In addition, help writers may have to create additional help information and help function identifiers for the new controls. Software developers also have to update their source code to reflect any changes made by the help writers. If the help writers or software developers do not coordinate their changes, the help functions in the computer software created will not function properly.

Another problem with creating help functions is that multiple help functions may be created that use the same non-unique help identifier for a single graphical control. In this case, the help system will not be able to display correct help information for such a control. Yet another problem associated with creating help functions is that certain graphical controls require special handling. For example, the "OK" and "CANCEL" controls are typically displayed as graphical buttons in a dialog box and have default help information provided by the windowed operating system. As a result, help writers typically do not provide help information or help identifiers for such controls and may not properly coordinate any changes with the software developers that may be required to the corresponding help functions for such controls.

Yet another problem associated with creating help functions is that some dialog boxes with graphical controls cannot be viewed when a computer software application is executed. For example, some dialog boxes may only be displayed if optional software components are installed. As a result, the computer software application may contain help functions and help identifiers that will never be used.

Yet another problem associated with creating help functions is that it is not possible for help writers to immediately test new help functions. The new help functions and the computer software which contain the help functions both have to be completed before any testing can occur.

Yet another problem associated with creating help functions is that complex computer software may contain hundreds of controls in numerous dialog boxes. A help writer may create help information or assign a help identifier to a help function that already exits, while a software developer may use two or more types of help information or help identifiers for the same control. This may create confusion for the help system as well as a software developer trying to use the help functions.

SUMMARY OF THE INVENTION

In accordance with an illustrative embodiment of the present invention, the problems associated with coordinated programming of context-sensitive help functions and computer software applications are overcome. According to the illustrative embodiment, with information provided to a help editor, the help editor automatically generates a set of files for integrating context sensitive help functions into a computer software application.

A help editor operates upon a computer software application. The computer software application includes software components such as graphical control objects within dialog boxes.

The help editor receives context-sensitive help information associated with the software components. The context-sensitive help information can replace default help information for a software component.

The help editor then creates help development files for integrating context-sensitive help functions for software components into the computer software application. According to the illustrative embodiment, the help editor creates header files describing the context-sensitive help information and creates map data structures associating software components with help information. The help editor generates these files from help information and information about the software components. For example, the help editor receives a control object map associating graphical control object identifiers with help information identifiers. The help editor filters the control object map to create one or more map data structures. If the graphical control object identifiers are numerical, the help editor can replace them with mnemonic identifiers that are easier for a programmer to understand.

In the illustrative embodiment, the help editor displays the help development files for editing by a user. The user selectively configures the displayed files, resulting in one or more sets of help development files. For example, the user can select software components for inclusion in or removal from the sets of help development files. The user can divide a set of help development files into separate sets of help development files. When the software components are graphical controls of dialog boxes, the user can specify a set of help development files for each dialog box, or for selected dialog boxes. The user can specify that the help development files include information for integrating context-sensitive help functions for all software components or for all non-default software components. In an alternative embodiment of the present invention, instead of configuration by a user, the help editor automatically configures the files.

In the illustrative embodiment, after the user configures the help development files, the help editor generates source code usable by an application programmer for integrating context-sensitive help functions into the computer software application. For example, the help editor generates source code header files and map data structures for integration into a computer software application.

The help editor in an illustrative embodiment of the present invention includes a novel construction of modules: a dialog-box-extraction-module for locating dialog boxes of a computer software application; a dialog-box-creation-and-display-module which creates and displays a dialog box, including graphical controls within the dialog box; a dialog-box-data-organization-module which organizes and manipulates dialog box data, including data for the properties of graphical controls of the dialog box, and which saves the graphical control data to a control object map; a help-topic-creation-module which organizes help information; and a dialog-box-code-generation-module which generates help development files for integrating context-sensitive help functions into the computer software application.

The foregoing and other features and advantages of an illustrative embodiment of the present invention will be more readily apparent from the following detailed description, which proceeds with reference to the accompanying drawings.

DETAILED DESCRIPTION OF AN ILLUSTRATIVE EMBODIMENT

Figure 1:
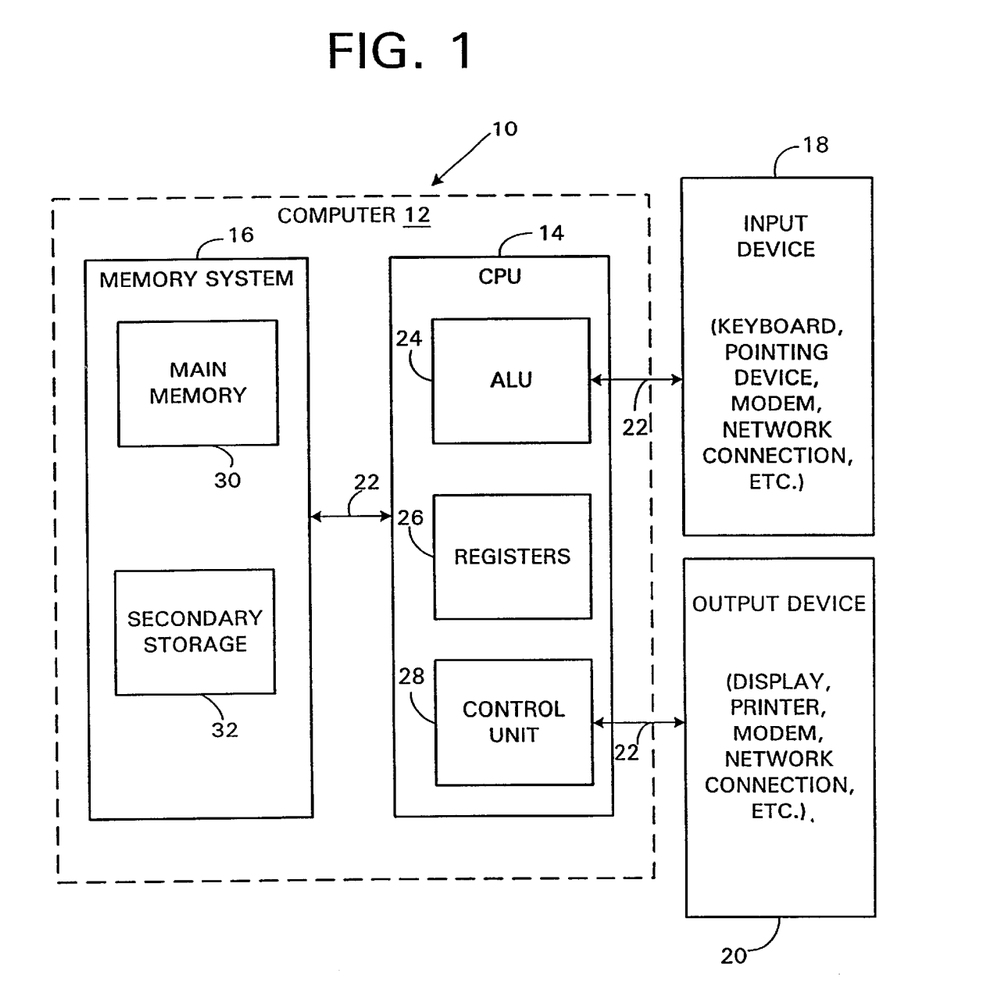
FIG. 1 is a block diagram of a computer system used to implement an illustrative embodiment of the present invention.

Referring to FIG. 1, an operating environment for an illustrative embodiment of the present invention is a computer system 10 with a computer 12 that comprises at least one high speed processing unit (CPU) 14, in conjunction with a memory system 16, an input device 18, and an output device 20. These elements are interconnected by a bus structure 22.

The illustrated CPU 14 is of familiar design and includes an ALU 24 for performing computations, a collection of registers 26 for temporary storage of data and instructions, and a control unit 28 for controlling operation of the system 10. Any of a variety of processors, including those from Digital Equipment, Sun, MIPS, IBM, Motorola, NEC, Intel, Cyrix, AMD, Nexgen and others are equally preferred for CPU 14. Although shown with one CPU 14, computer system 10 may alternatively include multiple processing units.

The memory system 16 includes main memory 30 and secondary storage 32. Illustrated main memory 30 is high speed random access memory (RAM) and read only memory (ROM). Main memory 30 can include any additional or alternative high speed memory device or memory circuitry. Secondary storage 32 takes the form of long term storage, such as ROM, optical or magnetic disks, organic memory or any other volatile or non-volatile mass storage system. Those skilled in the art will recognize that memory 16 can comprise a variety and/or combination of alternative components.

The input and output devices 18, 20 are also familiar. The input device 18 can comprise a keyboard, mouse, pointing device, audio device (e.g., a microphone, etc.), or any other device providing input to the computer system 10. The output device 20 can comprise a display, a printer, an audio device (e.g., a speaker, etc.), or other device providing output to the computer system 10. The input/output devices 18, 20 can also include network connections, modems, or other devices used for communications with other computer systems or devices.

As is familiar to those skilled in the art, the computer system 10 further includes an operating system and at least one application program. The operating system is a set of software which controls the computer system's operation and the allocation of resources. The application program is a set of software that performs a task desired by the user, making use of computer resources made available through the operating system. Both are resident in the illustrated memory system 16.

In accordance with the practices of persons skilled in the art of computer programming, the present invention is described below with reference to acts and symbolic representations of operations that are performed by computer system 10, unless indicated otherwise. Such acts and operations are sometimes referred to as being computer-executed. It will be appreciated that the acts and symbolically represented operations include the manipulation by the CPU 14 of electrical signals representing data bits which causes a resulting transformation or reduction of the electrical signal representation, and the maintenance of data bits at memory locations in memory system 16 to thereby reconfigure or otherwise alter the computer system's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, and any other volatile or non-volatile mass storage system readable by the computer 12. The computer readable medium includes cooperating or interconnected computer readable media, which exist exclusively on computer system 10 or are distributed among multiple interconnected computer systems 10 that may be local or remote.

In an illustrative embodiment of the present invention, the computer system 10 preferably uses the Windows 95 client/server operating system. However, other client/server operating systems (e.g. Windows NT, Windows CE, by Microsoft Corporation, OS/2, by IBM, etc.) could also be used. A client/server operating system is an operating system which is divided into multiple processes of two different types: server processes, each of which typically implements a single set of services, and client processes, which request a variety of services from the server processes. Object oriented programming is used to design the client/server operating system, and applications which run under the client/server operating system, where objects represent system resources.

For example, the Windows 95 client/server operating system provides shareable resources, such as files, memory, processes and threads, which are implemented as "objects" and are accessed by using "object services." As is well known in the art, an "object" is a data structure whose physical format is hidden behind an object type definition. Data structures, also referred to as records or formats, are organization schemes applied to data so that it can be interpreted, and so that specific operations can be performed on that data. Such data structures impose a physical organization on the collection of data stored within computer memory 16 and represent specific electrical, magnetic or organic elements.

An "object type," also called an "object class," comprises a data-type, services that operate on instances of the data type, and a set of object attributes. An "object attribute" is a field of data in an object that partially defines that object's state. An "object service" implements and manipulates objects, usually by reading or changing the object attributes. "Object oriented design" is a software development Technique in which a system or component is expressed using objects.

An object typically has two components: a function table containing a pointer to each object member function (i.e., sometimes known as an object method) defined in the object's class, and a data block containing the current values for each object variable (i.e., data members, sometimes known as object properties). An application has some reference to an object through an object pointer. An application obtains this object reference by using some type of function call (direct or implied) in which that function allocates an object block in computer memory, initializes the function table, and returns the reference to the computer memory to an application. The computer memory may be local or distributed on a remote computer.

The Windows 95 operating system allows users to execute more than one program at a time by organizing the many tasks that it must perform into "processes." The operating system allocates a portion of the computer's resources to each process and ensures that each process's program is dispatched for execution at the appropriate time and in the appropriate order.

In an illustrative embodiment of the present invention, processes are implemented as objects. A computer software application is executed on computer system 10 as a process. A process object comprises the following elements: an executable program; a private address space; system resources (e.g., communication ports and files) that the operating system allocates to the process as the program executes; and at least one "thread of execution." A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

The Component Object Model (COM) and Distributed Component Object Model (DCOM) are models used for object-oriented programming. The COM and DCOM specify how objects within a single application or between applications (e.g. client/server applications) interact and communicate by defining a set of standard interfaces. Interfaces are groupings of semantically related functions through which a client application accesses the services of a server application. Object Linking and Embedding (OLE), such as OLE Version 2 and ActiveX Controls (network activation controls) by the Microsoft Corporation of Redmond, Wash., are based in part on the Component Object Model and allow the creation of objects of different formats which operate on data through defined interfaces, rather than operating on the applications responsible for the data. ActiveX controls are based in part on OLE technologies. Object data can be embedded within an object, or linked to it, so that only a link reference to the data is stored in the object.

In accordance with an illustrative embodiment of the present invention, a method and apparatus for creating context-sensitive help functions is used. Context-sensitive help allows a user to select a software component that has been displayed on a display device and then request help on the function of the displayed software component. For example, a computer software application may have a dialog box with multiple graphical control objects for which context sensitive help is displayed. A dialog box is a pop-up box which displays additional information about the computer software application for a user. A graphical control object is an object which displays a graphical component such as a graphical button, graphical menu, or other graphical entity that accepts input from a user (e.g., allows the graphical object to be selected). An example of a graphical control object is an Object Linking and Embedding (OLE) control or an ActiveX control known to those skilled in the art. For more information on OLE controls see *OLE Controls Inside Out*, by Adam Denning, Microsoft Press, Redmond, Wash., 1995.

Figure 2:
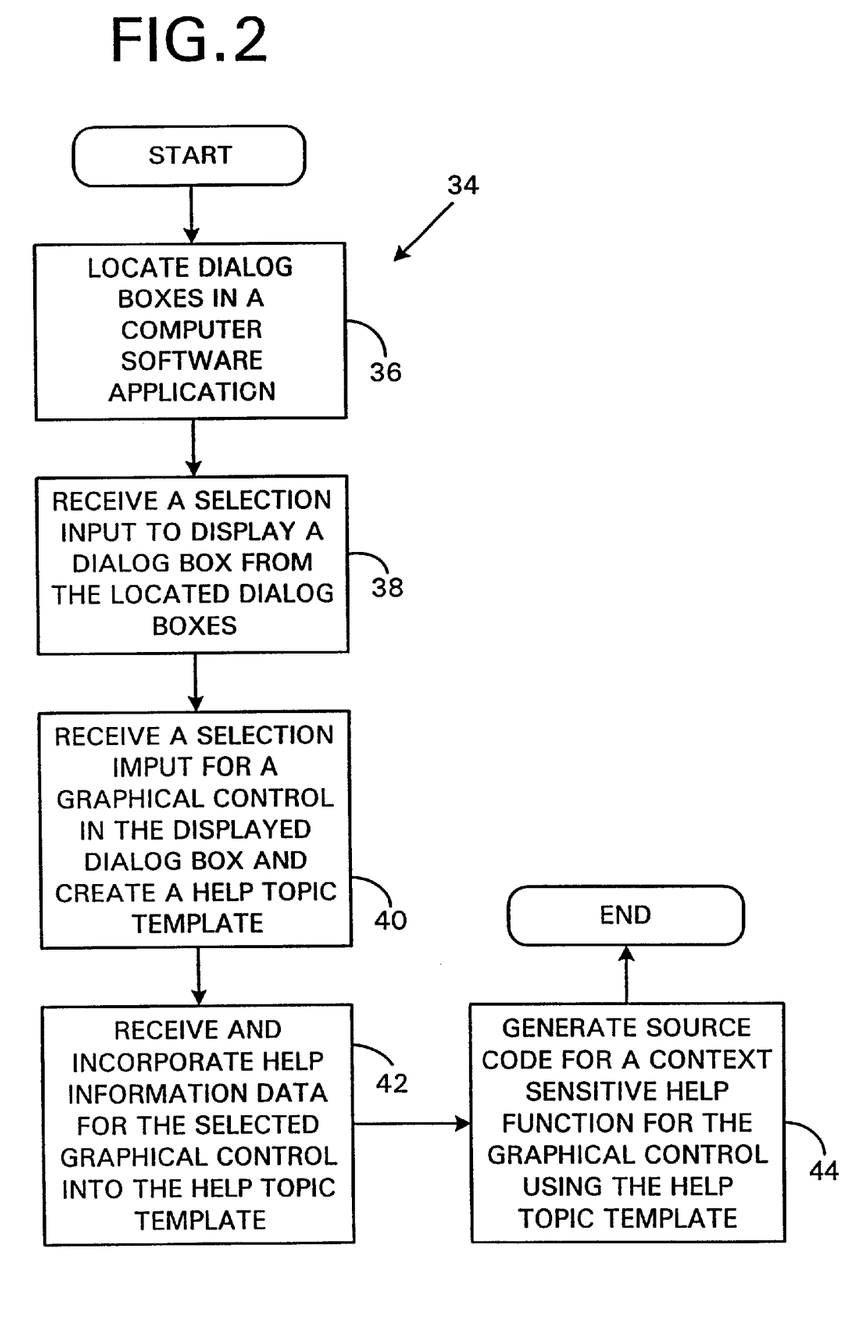
FIG. 2 is a flow diagram illustrating a method for creating help functions in an illustrative embodiment of the present invention.

FIG. 2 illustrates a method 34 for creating help functions in an illustrative embodiment of the present invention. Method 34 is implemented in a dialog box help editor which is executed on computer system 10. A computer software application for which context-sensitive help functions are being created need not be complete or executable to use method 34. A set of dialog boxes contained within a computer software application are located at step 36. In response to a first selection input, a dialog box from the set of located dialog boxes is displayed on a display device at step 38. The displayed dialog box typically includes one or more graphical control objects. In response to a second selection input, a help function template for a graphical control object selected in the displayed dialog box is created at step 40. The selection inputs at steps 38–40 are typically made in response to inputs made by a user with a mouse or other pointing device. In an alternative embodiment of the present invention, the selection inputs are made by another computer software application executing on the local computer system 10, or a remote computer system (e.g., with a message or a function call). Help information data is received and incorporated into the help function template for the selected graphical control object at step 42. In an illustrative embodiment of the present invention, the help information data is input by a help writer. In an alternative embodiment of the present invention, the help information data is read from a file, or sent by another computer software application. Computer source code for a context-sensitive help function for the selected graphical control object is generated at step 44. The source code is generated automatically and includes the help information data received for the help function template. Each of the steps of method 34 are explained below.

Figure 3:
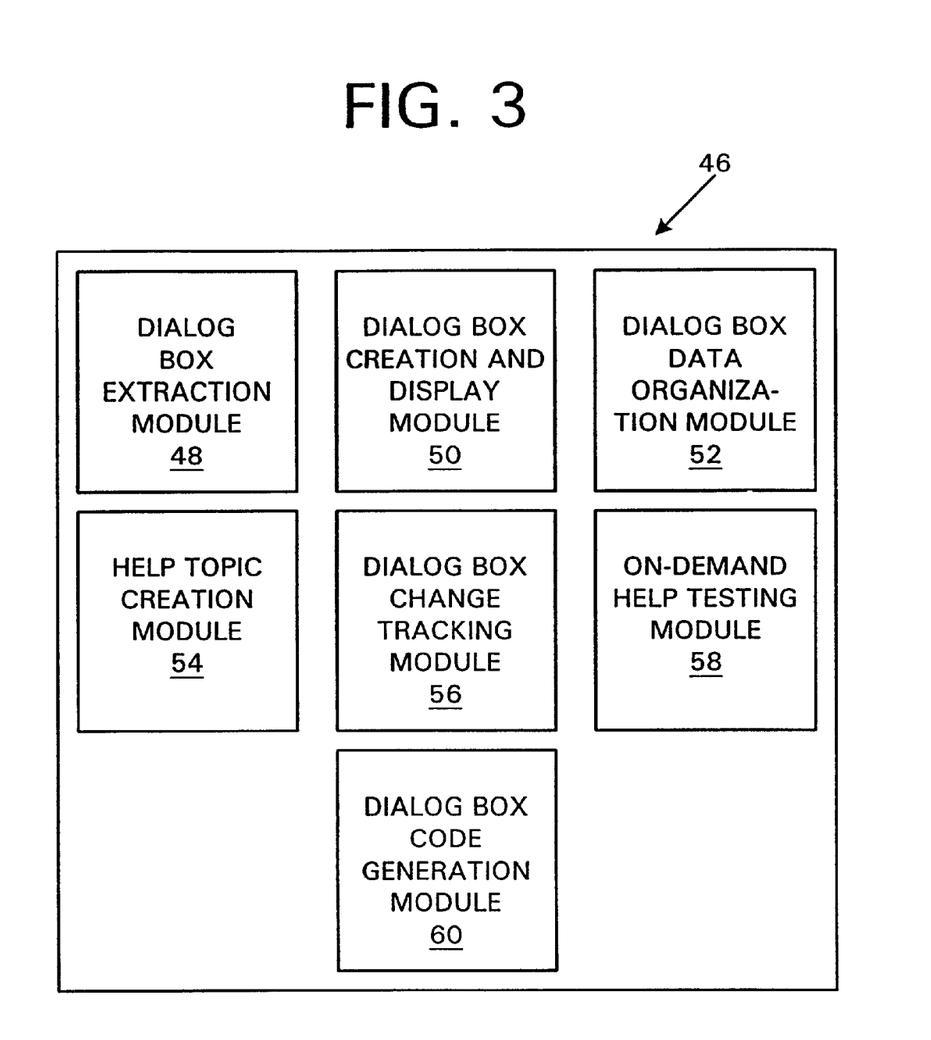
FIG. 3 is a block diagram illustrating a help editor for creating help functions in an illustrative embodiment of the present invention.

FIG. 3 is a block diagram of a dialog-box-help-editor 46 which uses method 34 to create context-sensitive help functions. The dialog-box-help-editor 46 comprises the following components: a dialog-box-extraction-module 48, a dialog-box-creation-and-display-module 50, a dialog-box-data-organization-module 52, a help-topic-creation-module 54, a dialog-box-change-tracking-module 56, an on-demand-help-testing-module 58, and a dialog-box-code-generation-module 60. However, more or fewer modules could also be used. In addition, the functionality of one or more of modules 48–60 could be combined into one or more of modules 48–60, or the illustrative modules 48–60 could be split into additional modules. Dialog-box-help-editor 46 is used on computer system 10 to create context-sensitive help functions.

Dialog-box-extraction-module

A computer software application that is being developed may have one or more dialog boxes with one or more graphical controls. When a help writer desires to create a context-sensitive help function for a graphical control in a dialog box, the dialog-box-help-editor 46 is used. A user or other entity (e.g., another computer software application) selects a computer software application from the dialog-box-help-editor 46. The computer software application is used to perform a desired function (e.g., network communications) on computer system 10. In response to a selection input, a dialog-box-extraction-module 48 in the dialog-box-help-editor 46 locates at step 36 any dialog boxes in the selected computer software application that is being created. The computer software application need not be complete or executable to use dialog-box-help-editor 46.

Figure 4:
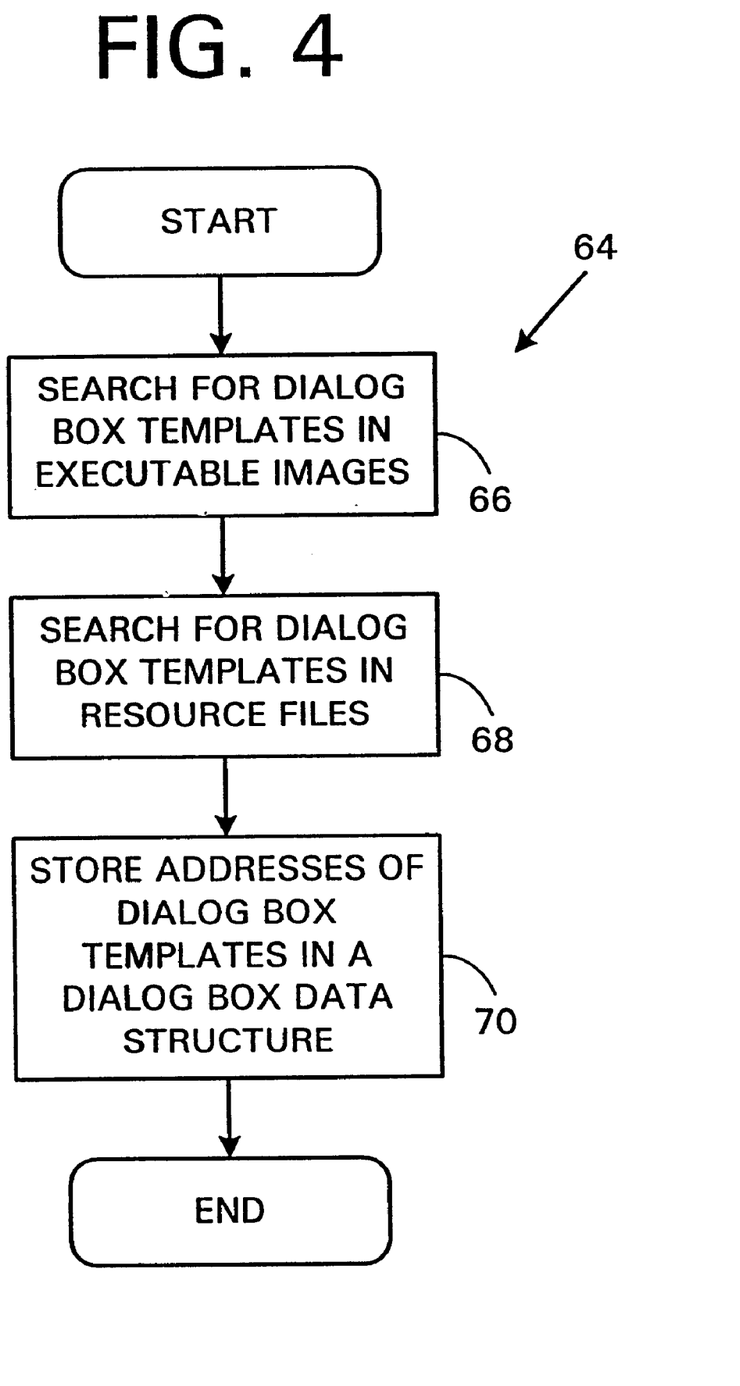
FIG. 4 is a flow diagram illustrating the locating of dialog box templates in an illustrative embodiment of the present invention.

FIG. 4 is a flow diagram showing a method 64 for locating dialog boxes at step 36 in accordance with the present invention. The dialog boxes are located without executing the computer software application which contains the dialog boxes. Dialog boxes are typically defined by dialog box templates. A dialog box template is a data structure that defines a dialog box and any graphical control objects it may contain. Information on dialog box templates can be found in the Win32 Application Programming Interfaces (APIs) by Microsoft Corporation. For more information on Win32 APIs see the Microsoft Corporation World Wide Web site at httpl/www.microsoft.com. However dialog box templates other than those defined by the Microsoft Corporation's Win32 APIs could also be used. To ensure that a help writer is provided access to any dialog boxes in a selected computer software application, dialog box templates are located by searching two types of files associated with a computer software application without executing the application. However, more than two types of files could also be searched.

Returning to FIG. 4, dialog box templates are located with dialog-box-help-editor 46 from dialog-box-extraction-module 48 by searching computer software applications stored as executable image files at step 66. An executable image file is a file that an operating system is able to execute on a computer system (e.g., an .EXE or Dynamic Link Library, or .DLL file executed on computer system 10). The dialog-box-extraction-module 48 locates dialog box templates in executable images at step 66 by searching for pre-defined published Win32 "executable file" APIs. Win32 executable file APIs are known to those skilled in the art.

Dialog box templates are also searched for in resources files (.RES) at step 68. A resource file is a binary-format file compiled from a human readable text file (.RC) that contains resources (e.g., as dialog box captions). A resource file may also be part of an executable image file. The dialog-box-extraction-module 48 locates dialog box templates in resource files at step 68 by searching through resource files following the pre-defined published Win32 "resource file" APIs. However, other searching methods could also be used to locate dialog boxes.

The dialog-box-extraction-module 48 does not make a copy of any dialog box templates it locates. Instead, it uses Win32 file memory mapping and stores the starting address location for dialog box templates in a dialog box search data structure at step 70 for later access. It also stores other relevant information such as dialog box captions and dialog box IDentifiers (IDs) in the dialog box data search structure as it searches files at steps 66–68. Pseudo-code for an illustrative dialog box search data structure is shown in Table 1 below.

TABLE 1

Dialog_box_search_data_structure {
Address of dialog box template
Dialog box ID

TABLE 1-continued

```
Dialog box caption
  other information fields
} [N];
```

The text "[N]" indicates an array of "N" instances of the dialog box search data structure. However, more or fewer fields in the dialog box search data structure could also be used. In an alternative embodiment of the present invention, located dialog box templates are copied and stored in the dialog box data search structure shown in Table 1 by the dialog-box-extraction-module 48 and the Win32 file memory mapping is not used to locate the dialog box templates. The search steps 66–68 are completed without executing the computer software application which contains the dialog boxes.

Dialog-box-creation-and-display-module

When the dialog-box-help-editor 46 receives a selection input to display a dialog box at step 38, a dialog-box-creation-and-display-module 50 retrieves the address of a dialog box template for the selected dialog box. The selection input can come from a user (e.g., with a mouse click) or from another software application. The selected dialog box is located by retrieving the address of a corresponding dialog box template stored in the dialog box search data structure (Table 1) by the dialog-box-extraction-module 48. The dialog-box-creation-and-display-module 50 makes a copy of the retrieved dialog box template in memory. The dialog-box-creation-and-display-module 50 then modifies the dialog box template to include attributes required to ensure that the dialog box is visible to a user and can be moved about a display screen easily (e.g., dialog box size in display coordinates, etc.).

For a graphical control object to be displayed in a dialog box, its object class has to have been registered with the operating system. The object class for a graphical control object includes the display color, display cursor type, the message handler to be used for the control, and other object information. The dialog box creation and control module 50 automatically checks for unregistered controls and registers them. Once the dialog box template has been prepared in memory with controls registered, the dialog-box-creation-and-display-module 50 passes the dialog box template to the Win32 API used by the operating system (e.g., with CreateDialogindirectParam) to create a dialog box user on a display device for a user. In an alternative embodiment of the present invention, the dialog-box-creation-and-control-module 50 creates the dialog box on a display device for a user without passing the dialog box template to the operating system.

Dialog-box-data-organization-module

Whenever the dialog-box-help-editor 46 displays a dialog box with the dialog-box-creation-and-display-module 50, it also creates an instance of an object containing object properties for any graphical control objects in the selected dialog box. The graphical control object properties are stored in a dialog object data structure and are managed by a dialog-box-data-organization-module 52. Pseudo-code for fields in the dialog object data structure is shown below in Table 2.

TABLE 2

```
dialog_object_data_structure {
  Dialog box ID.
  Dialog box caption.
  Control ID.
  Control caption.
  Help ID associated with the control.
  Help ID stored in the dialog template for the control (if any).
  Number (value) associated with the Help ID.
  Coordinates of the rectangle that bounds the control.
  Object class name for the control.
  Whether or not the control is static (i.e., static controls do not accept
    input from a user nor do they provide any output to a user. A
    label is an example of a static control).
  Whether or not the control has been clicked by the user.
  Whether or not the control has a default Help topic (e.g., an "OK" or
    "Cancel" graphical button).
  Whether or not the control has changed since the last time the dialog
    box help editor project was opened.
  Annotation a user has assigned to the control (if any).
}
```

However, more or fewer object properties could also be stored in the dialog object data structure.

Once the dialog-box-help-editor 46 has created a dialog object data structure (Table 2) with the dialog-box-data-organization-module 52, it adds the graphical control object information for the dialog box to a control object map for later use. The control object map is a keyed list of graphical control objects in the dialog box. A combination of the dialog box ID and the control ID are used to create a unique key for each graphical control object in the control object map. However, other keys can also be used. The control object map is used to locate an individual graphical control object within a dialog box and is used by a help writer who is creating context-sensitive help functions.

In order to preserve the current state of a computer software application when it is closed, the dialog-box-help-editor 46 allows a user to save the control object managed by the dialog-box-data-organization-module 52 to a file. The dialog-box-help-editor 46 updates the control object map each time a dialog box is opened. (See the Dialog-box-change-tracking-module section below.)

Help-topic-creation-module

The dialog-box-help-editor 46 uses OLE Automation to drive development of context-sensitive help functions. OLE Automation provides the ability for a client software application to have a reference to an object in a server software application on the same computer system 10, even though the two applications are not sharing the process memory. For more information on OLE Automation see *Inside OLE*, 2nd Edition, by Kraig Brockschmidt, Microsoft Press, 1995. However, other automation methods could also be used.

In response to a selection input of a graphical control at step 40, the dialog-box-help-editor 46 creates a new help topic template using a help-topic-creation-module 54. The help-topic-creation-module 54 automatically assigns a Help ID (e.g., IDH_X_Y) for the help topic template to a selected control by using a combination of the dialog box ID (X) and the control ID (Y) to ensure uniqueness. For example, if the dialog box ID is 100 and the control ID is 102, the Help ID for the selected control would become a combination of the two (e.g., IDH_100_102). However, other methods may also be used for assigning Help IDs. A user may choose to assign his or her own ID to a control by using the custom Help ID option available in the help-topic-creation-module 54. For example, a user may create a Help ID for a graphical button as IDH_BUTTON.

Figure 5:
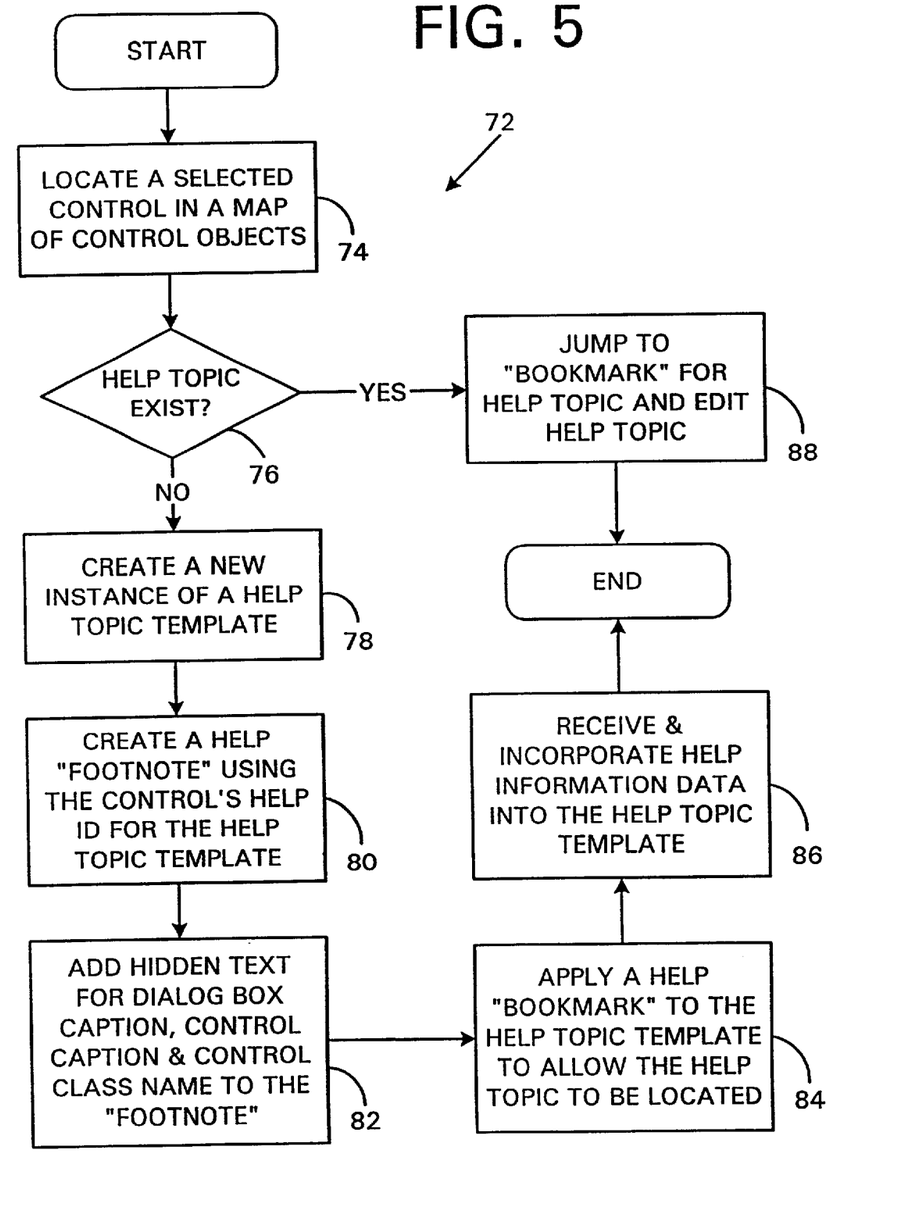
FIG. 5 is a flow diagram illustrating the creation of help information in an illustrative embodiment of the present invention.

FIG. 5 illustrates a method 72 for creating a context-sensitive help function for a graphical control object with the dialog-box-help-editor 46 at steps 40–42. The help-topic-creation-module 54 locates the selected control in the control object map (created by the dialog-box-data-organization-module 52) at step 74. Before creating a new context-sensitive help topic template, the help-topic-creation-module 54 checks to see if a help topic template already exists for the graphical control at step 76. If the help topic template does not exist, then an instance of a new help topic template is created at step 78. Creating a new help topic template includes creating a new Help ID for the selected graphical object control as was described above. The help-topic-creation-module 54 uses the Help ID for the selected control and creates a "footnote" for the help topic template using the Help ID as the footnote's identifier at step 80. Using object properties for the graphical control object, the help-topic-creation-module 54 adds "hidden" text to the footnote for the help topic template that includes the dialog box caption, the graphical control object caption, and the graphical control object's class name at step 82. The hidden text is used by a help writer to determine which dialog box and graphical object control are associated with the help topic template and are not typically displayed for a user. The help-topic-creation-module 54 applies a "bookmark" to the context-sensitive help topic template at step 84 to enable the dialog-box-help-editor 46 to locate the help topic template quickly and easily at a later time.

Help information data is received for the help topic template at step 42. The help information data is typically input by a help writer but may be read from a file or received from another computer software application. The dialog-box-help-editor 46 incorporates the help topic template with the appropriate help information data at step 86. The help topic template with the received help information data will be used to generate computer source code for a context-sensitive help function at step 44 as will be explained below.

If a help topic template already exists (i.e., was previously created using method 72) for the graphical control object at step 76, the help-topic-creation-module 54 instructs the dialog-box-help-editor 46 to jump to the bookmark for the existing help topic template at step 88. The existing help topic template can then be edited to change existing help information data.

Dialog-box-change-tracking-module

Figure 6:
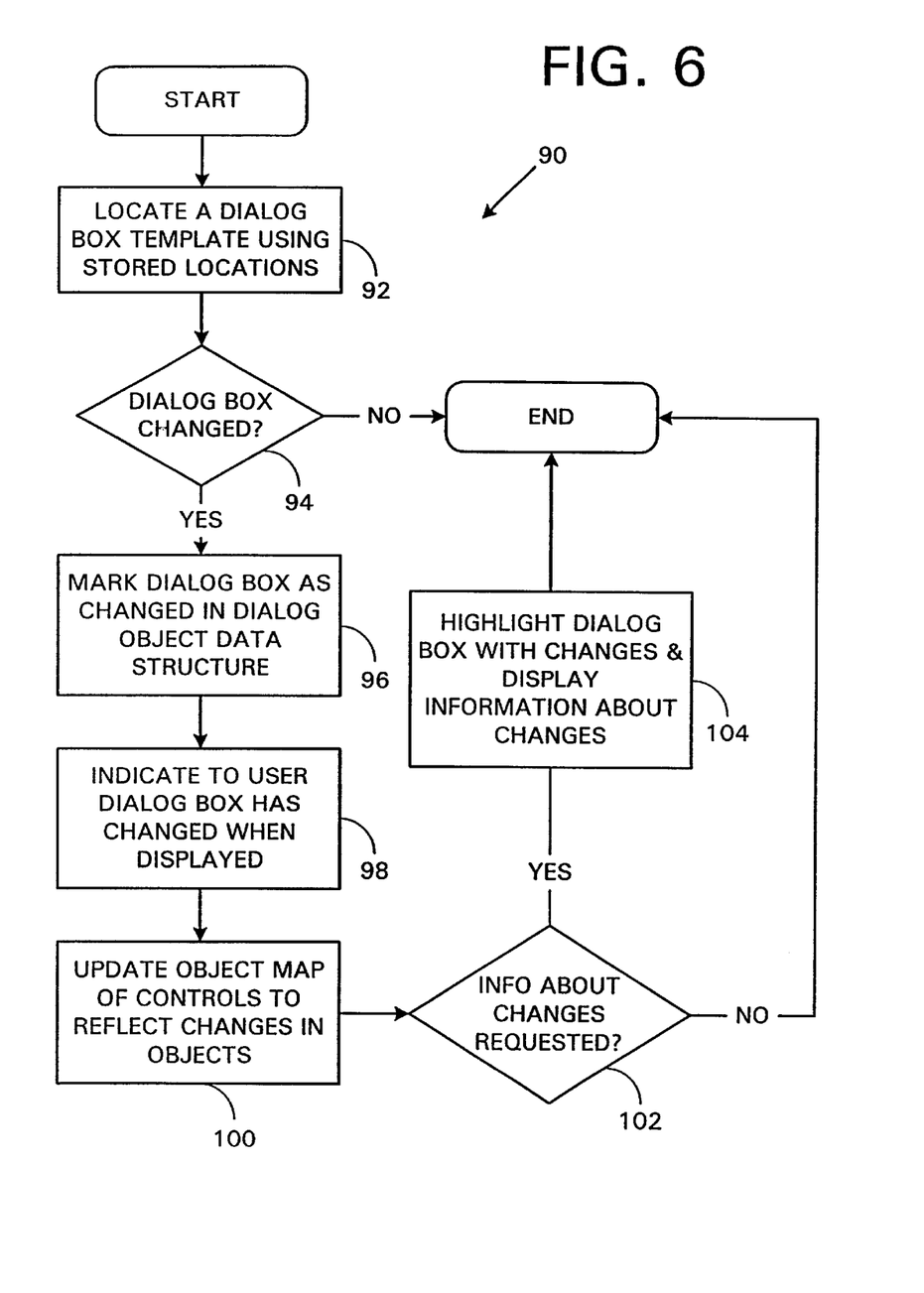
FIG. 6 is a flow diagram illustrating change tracking of dialog boxes in an illustrative embodiment of the present invention.

Each time the dialog-box-help-editor 46 displays a dialog box at step 38, it checks for any changes made to graphical control objects for the dialog box by comparing dialog box object data it has saved with dialog box object data in the current copy of the computer software application. The dialog-box-help-editor 46 uses a dialog-box-change-tracking-module 56 to track dialog box changes. As is shown in FIG. 6, the dialog-box-change-tracking-module 56 uses method 90 to track changes in dialog boxes. A selected dialog box template is located using stored locations from step 36 at step 92. If the dialog-box-change-tracking-module 56 finds that a graphical control object has changed in a selected dialog box at step 94, it marks a change attribute in the dialog object data structure (Table 2) at step 96. At step 98, the dialog-box-change-tracking-module 56 indicates that the dialog box has changed when the dialog box is displayed at step 38 by highlighting the selected dialog box (e.g., with a new display color).

To keep context-sensitive help information synchronized with the current executable image or resource files that comprise a computer software application, the dialog-box-change-tracking-module 56 updates the control object map as it is checking for changes in the dialog box at step 100. The control object map was created by the dialog-box-data-organization-module 52 discussed above. Upon a selection request at step 102, the dialog-box-change-tracking-module 56 highlights the graphical controls that have changed. If desired at step 102, the dialog box tracking module 56 displays detailed information about the changes made to a graphical control at step 104.

On-demand-help-testing-module

To allow help writers to see the help information they are writing as it will appear in the finished application, the dialog-box-help-editor 46 is able to create a temporary help file and implement context-sensitive help in a dialog box that it is currently displaying with an on-demand-help-testing-module 58. The context-sensitive help is displayed without executing the computer software application being developed.

Figure 7:
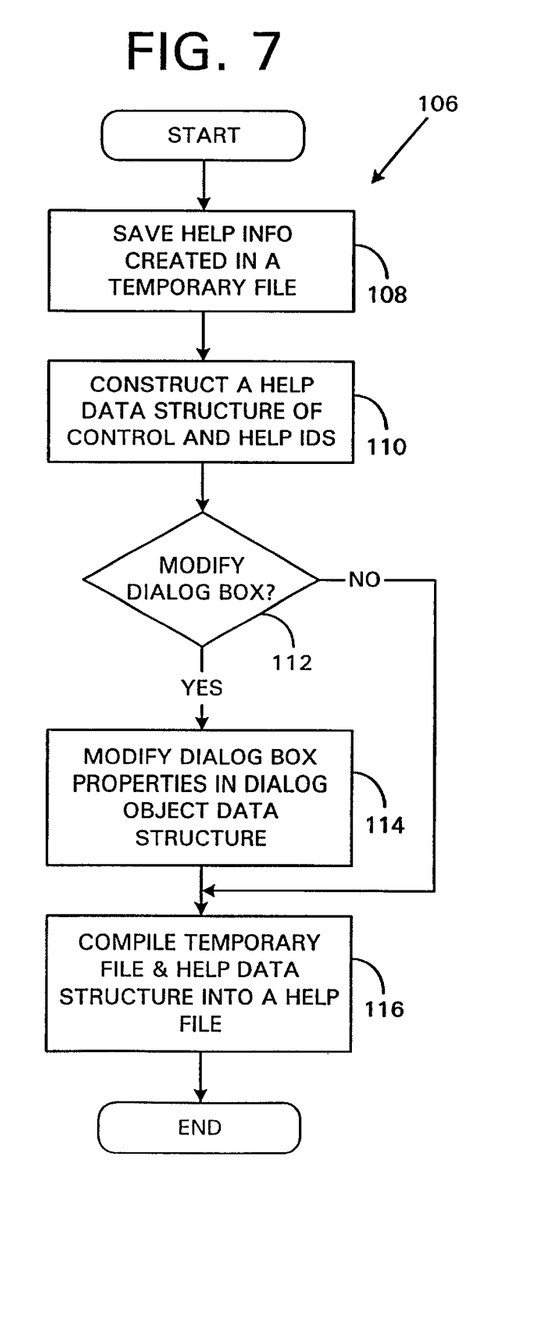
FIG. 7 is a flow diagram illustrating on-demand help testing in an illustrative embodiment of the present invention.

As is shown in FIG. 7, method 106 is used according to the present invention to provide on-demand help testing with an on-demand-help-testing-module 58. To create a help file, the on-demand-help-testing-module 58 saves help information created by the help-topic-creation-module 54 in a temporary file at step 108. In an illustrative embodiment of the present invention, the help information is saved in a Rich Text Format (RTF) in a temporary file. The Rich Text Format is known to those skilled in the art. However, other formats, can also be used. Using the object properties of the graphical controls in the dialog box, the on-demand-help-testing-module 58 dynamically constructs an array of control IDs and Help IDs at step 110.

If necessary at step 1 1 2, the attributes of the dialog box are modified in the dialog object data structure (Table 2) at step 114. The modifications include ensuring that the context Help question mark (?) graphical button appears in the title bar displayed by the Windows operating system. The on-demand-help-testing-module 58 then calls the Microsoft Help Workshop system to compile the RTF file and array of control IDs and Help IDs into a help file that can be used to display the help information at step 116. However, other applications could also be used to compile the help file. The help file can be used with the dialog-box-help-editor 46 to test context-sensitive help functionality without executing the computer software application being developed.

Figure 8:
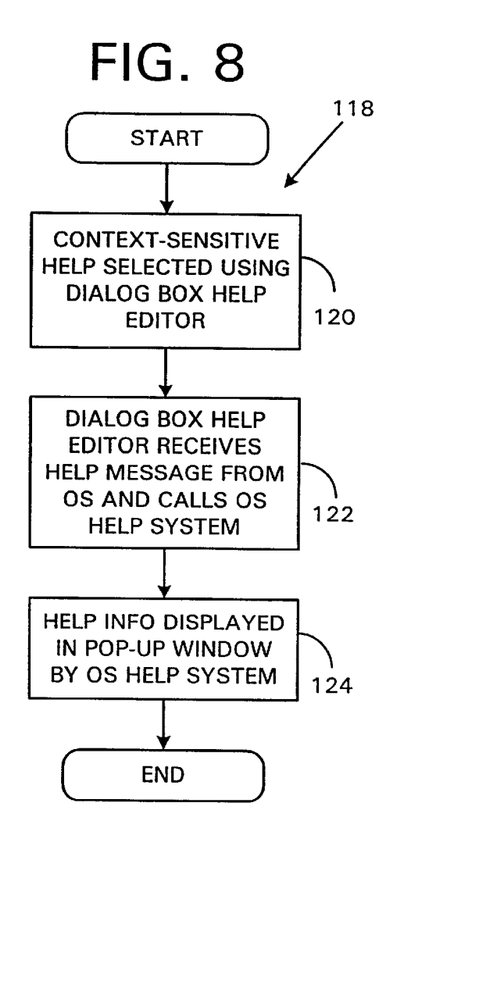
FIG. 8 is a flow diagram further illustrating on-demand help testing in an illustrative embodiment of the present invention.

As is shown in FIG. 8, context-sensitive help is tested using the help file and the dialog-box-help-editor 46 with method 118. When a graphical control in a dialog box is selected for a context-sensitive help function residing in the saved help file at step 120, the dialog-box-help-editor 46 will receive a context-sensitive help message sent by the operating system. When the dialog-box-help-editor 46 receives a context-sensitive help message, the editor 46 passes the message to the on-demand testing module 58. The on-demand testing module 58 calls the Windows Help system at step 122, and passes it a pointer to the array of control IDs and Help IDs saved in the help file at step 116.

Subsequently, the Windows Help system displays at step 124 the appropriate help topic for the selected graphical control object in a pop-up testing window. The context-sensitive help functions are tested without executing the computer software application in which they will be included. An illustrative embodiment of the present invention allows for creating and testing of the context-sensitive help functions before the computer software application in which they will be included is complete by interfacing with the operating system and receiving context-sensitive help messages in the dialog-box-help-editor 46. In an alternative embodiment of the present invention, the dialog-box-help-editor 46 displays the appropriate help topic for the control in a pop-up window for a user without operating system interactions or using the Windows Help System.

Methods 106 and 118 provide an advantage for developing and testing context-sensitive help functions that will be used by a computer software application. Instead of merely displaying a help topic in a pop-up window, the dialog-box-help-editor 46, implements and uses context-sensitive help in the same manner the finished computer software application will use (e.g., receiving a message to display a help topic). This allows a help writer to test the implementation of context-sensitive help functions after they are created and observe how the context-sensitive help function will behave in the finished application without executing the finished application.

Dialog-box-code-generation-module

The dialog-box-help-editor 46 uses a dialog-box-code-generation-module 60 to generate source code for a context-sensitive help function at step 44. The dialog-box-code-generation-module 60 generates header files and help data structures (e.g., arrays of the Help IDs generated) required for implementing context-sensitive help in an application. Since the dialog-box-help-editor 46 stores the properties for the controls in a control object map, it is relatively easy for it to generate help header files and help data structures in multiple formats by simply filtering the data in the control object map using the dialog-box-code-generation-module 60.

Figure 9:
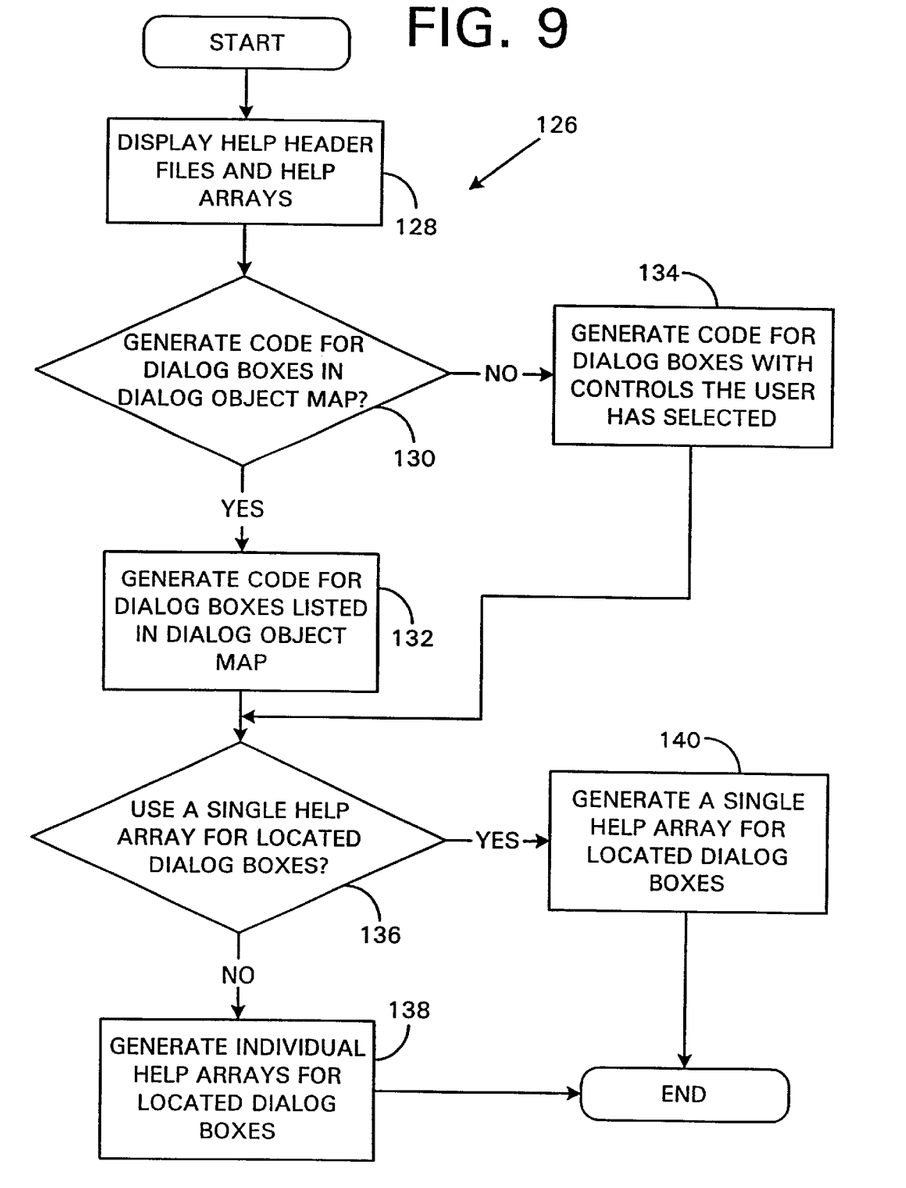
FIG. 9 is a flow diagram illustrating source code generation for help functions in an illustrative embodiment of the present invention.

As is shown in FIG. 9, a method 126 according the present invention is used by the dialog-box-code-generation-module 60 to generate code for context-sensitive help functions. The dialog-box-code-generation-module 60 displays the help header and help data structures in an editing window at step 128. The help header and help data structures can be modified in the editing window. The dialog-box-code-generation-module 60 checks at step 130 if every graphical control object in the control object map is to be included in the help header and help data structure(s). If so, at step 130 every graphical control object in the control object map is used to generate the help header and help data structure(s) at step 132. If not, just those dialog boxes that have controls selected are used at step 134. This step allows graphical controls which are not needed by the computer software application to be removed (e.g., graphical controls for optional software components). In an alternative embodiment of the present invention, less than every graphical control in the control object map and less than all controls selected can be used to generate the help header files and help data structures.

The dialog-box-code-generation-module 60 checks at step 136 if a single help data structure for all of the located dialog boxes is to be created. If so, at step 138, a single help data structure is created for all located dialog boxes. If not, an individual help data structure for each located dialog box is created at step 140. This step allows multiple dialog boxes to use the same control IDs and Help Ids. In an alternative embodiment of the present invention, the single help data structure can contain less than all of the located dialog boxes, or an individual data structure is not created for each located dialog box (i.e., one or more located dialog boxes are skipped).

In an illustrative embodiment of the present invention controls that have default help topics (e.g., the "OK" or "CANCEL" buttons) are included in the generated help header files and help data structures when the default help topics have been overridden. This feature allows a help writer to alter the default help topic information. In an alternative embodiment of the present invention, controls that have default help topics which are not altered are also included.

If a help writer specifies a help header file in the computer software application that contains control IDs, the dialog-box-code-generation-module 60 is able to automatically substitute control ID numeric values with their mnemonic equivalent for a context-sensitive help function. Dialog box templates typically contain only numeric control ID values. As is known in the art, it is considered good programming practice to use mnemonic identifiers (e.g., IDC_BUTTON) in source code instead of actual numeric values (e.g., 100, where IDC_BUTTON=100).

Once the computer source code for context-sensitive help have been generated by the dialog-box-help-editor 46, the help header files and help data structures can be used by software developers as the development of a computer software application is completed. This helps the help writers and software developers coordinate their changes and makes the software development more efficient and less prone to errors.

The method 34 and editor 46 of the illustrative embodiment of the present invention provides the following advantages. If dialog boxes or graphical controls change during the development process, the dialog-box-help-editor 46 notes the changes and informs a help writer. The dialog-box-help-editor 46 can then easily regenerate new help source code to reflect the changes. If multiple dialog boxes use the same control IDs, the dialog-box-help-editor 46 can generate one help array per dialog box to circumvent this problem. The dialog-box-help-editor 46 allows a help writer to associate a single Help ID with multiple controls in one or more dialog boxes. The dialog-box-help-editor 46 notes which controls have default help topics, and checks if a help writer has overridden the default help topics. Since the dialog-box-help-editor 46 extracts dialog box templates from executable and resource files, it has access to and can display any dialog boxes that have been already created. The computer software application containing the dialog boxes need not be executed to use the dialog-box-help-editor 46. The dialog-box-help-editor 46 allows context-sensitive help to be dynamically implemented by a help writer. Since the implementation and execution is the same in the dialog-box-help-editor 46 as it is in the finished application, the help writer can test the context-sensitive help functionality as well as examine the help information created. The dialog-box-help-editor 46 manages all of the Help IDs in a software application being developed so there is no confusion between help writers and software developers over Help IDs, etc.

It should be understood that the programs, processes, and methods described herein are not related or limited to any particular type of computer apparatus, unless indicated otherwise. Various types of general purpose or specialized computer apparatus may be used with or perform operations in accordance with the teachings described herein.

In view of the wide variety of embodiments to which the principles of our invention can be applied, it should be understood that the illustrated embodiments are exemplary only, and should not be taken as limiting the scope of our invention. Rather, we claim as our invention all such embodiments as come within the scope and spirit of the following claims and equivalents thereto.

We claim:

1. A method for automatically generating source code for integrating into a computer software application context-sensitive help functions for graphical control objects of the computer software application, the method comprising:

provinding a computer software application, wherein the computer software application comprises one or more dialog boxes, and wherein a dialog box comprises one or more graphical control objects;

providing context-sensitive help information for the graphical control objects of the computer software application, wherein the context-sensitive help information comprises textual help descriptions associated with the graphical control objects;

creating one or more header files about the context-sensitive help information;

creating one or more map data structures for associating graphical control objects with the context-sensitive help information;

displaying the header files and map data structures;

editing by a help developer the displayed header files and map data structures, whereby the help developer configures context-sensitive help functions for the computer software application; and generating one or more source code files for the edited help header files and edited map data structures, whereby the source code files are usable by a programmer to integrate into the computer software application one or more context-sensitive help functions as configured by the help developer.

2. A computer-readable storage medium having stored therein computer executable instructions for performing the method of claim 1.

3. A computer-readable medium having computer-executable modules comprising:

a dialog box extraction module for locating one or more dialog boxes of a computer software application;

a dialog box creation and display module for preparing a dialog box for display and displaying the dialog box, wherein the dialog box encapsulates one or more control objects;

a dialog box data organization module for managing the dialog box, wherein the dialog box data organization module organizes data for the one or more control objects of the dialog box, and wherein the dialog box data organization module saves control object data to a control object map;

a help topic creation module for associating context-sensitive help information with the one or more control objects of the-dialog box as used in the dialog box; and a dialog box code generation module for generating help development files for integrating into the computer software application context-sensitive help functions for one or more of the control objects.

4. A method for automatically generating help development files for integrating context-sensitive help functions into a computer software application, the method comprising:

providing a computer software application, wherein the computer software application comprises one or more software components;

providing context-sensitive help information for the software components; and automatically generating a set of one or more help development files, wherein the set of help development files comprises source code information usable by a programmer during development of the computer software application to integrate context-sensitive help functions for software components into the computer software application.

5. A computer-readable storage medium having stored therein computer executable instructions for performing the method of claim 4.

6. The method of claim 4 wherein the set of one or more help development files comprises information usable to integrate context-sensitive help functions for all of the software components into the computer software application.

7. The method of claim 4 wherein the software components are graphical controls of dialog boxes of the computer software application.

8. The method of claim 7 further comprising:

automatically generating a set of one or more help development files for each of plural dialog boxes of the computer software application.

9. The method of claim 7 further comprising:

automatically generating a set of one or more help development files for each dialog box of the computer software application.

10. The method of claim 4 wherein the context-sensitive help information for a software component comprises context-sensitive help information in place of default help information.

11. The method of claim 10 wherein the set of help development files comprises information usable to integrate context-sensitive help functions for all non-default software components into the computer software application.

12. The method of claim 4 wherein the set of help development files comprises at least one header file and at least one map data structure.

13. The method of claim 12 wherein the map data structure comprises a map of software component identifiers to help information identifiers.

14. The method of claim 4 wherein a user configures the set of help development files.

15. The method of claim 4 wherein generating comprises:

providing relation information on associations between the software components and the context sensitive help information; and based upon the relation information, creating the set of help development files.

16. The method of claim 15 wherein the software components are graphical controls of dialog boxes of the computer software application, and wherein the relation information comprises a control object map.

17. The method of claim 16 wherein the control object map comprises a map of numerical graphical control identifiers to help information identifiers, and wherein creating the set of help development files comprises overwriting at least one numerical graphical control identifier with a mnemonic graphical control identifier.

18. The method of claim 4 further comprising:

displaying one or more of the help development files in the set of help development files; and editing the displayed help development files.

19. A computer-readable storage medium having stored therein computer executable instructions for performing the method of claim 18.

20. A method for automatically generating help development files for integrating context-sensitive help functions into a computer software application, the method comprising:

providing a computer software application, wherein the computer software application comprises one or more graphical controls of dialog boxes;

providing context-sensitive help information for the one or more graphical controls;

automatically generating a set of one or more help development files, wherein the set of help development files comprises information usable by a programmer during development of the computer software application to integrate context-sensitive help functions for the one or more graphical controls into the computer software application, and wherein generating comprises:

providing relation information on associations between the one or more graphical controls and the context sensitive help information, wherein the relation information comprises a control object map; and based upon the relation information, creating the set of help development files, wherein said creating comprises filtering the control object map.

21. A method for automatically generating help development files for integrating context-sensitive help functions into a computer software application, the method comprising:

providing a computer software application, wherein the computer software application comprises one or more software components;

providing context-sensitive help information for the software components;

automatically generating a set of one or more help development files, wherein the set of help development files comprises information usable by a programmer during development of the computer software application to integrate context-sensitive help functions for software components into the computer software application;

displaying one or more of the help development files in the set of help development files; and editing the displayed help development files, wherein during editing a user selects software components, and wherein after editing the set of help development files comprises information usable to integrate context-sensitive help functions for all but the selected software components into the computer software application.

22. A method for automatically generating help development files for integrating context-sensitive help functions into a computer software application, the method comprising:

providing a computer software application, wherein the computer software application comprises one or more software components;

providing context-sensitive help information for the software components;

automatically generating a set of one or more help development files, wherein the set of help development files comprises information usable by a programmer during development of the computer software application to integrate context-sensitive help functions for software components into the computer software application;

displaying one or more of the help development files in the set of help development files; and editing the displayed help development files, wherein during editing a user selects software components, and wherein after editing the set of help development files comprises information usable to integrate context-sensitive help functions for the selected software components into the computer software application.

23. The method of claim 22 further comprising:

automatically generating a second set of one or more help development files, wherein the second set of help development files comprises information usable to integrate context-sensitive help functions for the non-selected software components into the computer software application.

* * * * *

UNITED STATES PATENT AND TRADEMARK OFFICE
CERTIFICATE OF CORRECTION

PATENT NO.   : 6,246,404 B1
DATED        : June 12, 2001
INVENTOR(S)  : Randall James Feigner and Ralph Everett Walden It is certified that error appears in the above-identified patent and that said Letters Patent is hereby corrected as shown below:

Column 8,
Line 19, "httpl/" should be -- http:// --.

Column 15,
Line 54, "the-dialog" should be -- the dialog --.

Signed and Sealed this

Fifth Day of March, 2002

Attest:

JAMES E. ROGAN
Attesting Officer    Director of the United States Patent and Trademark Office